United States Patent
Tiemeyer

(10) Patent No.: US 6,273,923 B1
(45) Date of Patent: Aug. 14, 2001

(54) CATALYTIC VACUUM DISTILLATION PROCESS

(75) Inventor: Eric B. Tiemeyer, Dallas, TX (US)

(73) Assignee: Kenaf BioCatalytic Services, LLC, Dallas, TX (US)

( * ) Notice: Under 35 U.S.C. 154(b), the term of this patent shall be extended for 0 days.

(21) Appl. No.: 09/236,464

(22) Filed: Jan. 25, 1999

(51) Int. Cl.⁷ .................................. C10L 5/00; C10L 5/48
(52) U.S. Cl. .................................. 44/593; 44/605; 44/620
(58) Field of Search .............................. 44/629, 620, 593, 44/545, 605

(56) References Cited

U.S. PATENT DOCUMENTS

| | | | |
|---|---|---|---|
| 4,985,049 | * | 1/1991 | Kim ........................................ 44/629 |
| 5,503,646 | * | 4/1996 | McKenny et al. ..................... 44/620 |
| 5,681,483 | * | 10/1997 | Navaree et al. ..................... 210/777 |

* cited by examiner

Primary Examiner—Margaret Medley
Assistant Examiner—Cephia D. Toomer
(74) Attorney, Agent, or Firm—John E. Vandigriff

(57) ABSTRACT

An apparatus and process combines a mixture of hazardous waste generated by petroleum refining and/or production with a catalytic media and then process the mixture by subjecting the mixture to a heating process and a vacuum system to provide a dry solid fuel.

13 Claims, 2 Drawing Sheets

CATALYTIC VACUUM DISTILLATION PROCESS

FIELD OF THE INVENTION

This invention relates to processing of oily wastewater emulsions generated by petroleum refining and/or production, and more particularly to a Catalytic Vacuum Distillation (CVD) process which promotes an environmentally friendly method to safely and efficiently remove and recover the water and hydrocarbons in these wastes while simultaneously producing a high energy solid fuel for use in industrial cement plants and/or power plants.

BACKGROUND OF THE INVENTION

Certain hazardous wastes and wastewater generated by the petroleum industry (KO48, KO49, KO51, FO37 and FO38) are emulsified mixtures of solids, water and oil that are extremely difficult to treat, transport, and dispose of. These wastes, in their original state, cannot be directly used as a fuel without considerable dewatering, nor can they be feasiblely transported in conventional liquids tankers due to their high solids content. Costs associated with dewatering, transporting, and disposing of these wastes are very burdensome to the petroleum refining industry. Currently, refineries and petrochemical plants are using filter presses, high speed centrifuges, and thermal desorption to process these wastes and waste waters. These currently used processes involve substantial capital investments along with exorbitant operating costs. More importantly, they generate a waste material that is classified as a hazardous waste and must be incinerated and/or land filled with a significant cost and continued liability. Fiscal costs and future liabilities associated with dewatering, transporting, and disposing of these wastes are very burdensome to the petroleum and petrochemical industries.

An apparatus and process of filtration is disclosed and claimed in U.S. Pat. No. 5,366,520. The apparatus in the aforementioned patent is a converted tanker truck in which fixed tanks are used to process and transport the processed mixtures. The tanks are fixed in U.S. Pat. No. 5,366,520 and they cannot be removed from the tanker truck, and the processed material has to be removed from the tanker in order for the tanker to process and transport more material.

SUMMARY OF THE INVENTION

The invention is a Catalytic Vacuum Distillation (CVD) process which promotes an environmentally friendly method to safely and efficiently remove and recover the water and hydrocarbons in these wastes and waste waters while simultaneously producing a high energy solid fuel. The new process has very low capital and operating costs, recovers valuable products for reuse in the refinery or petrochemical plant, and produces a viable solid fuel product instead of a waste. The oily waste water emulsions generated by petroleum refining and/or production are combined with a catalytic media and then processed by subjecting the mixture to a heating process and a vacuum system to recover hydrocarbons and simultaneously create a high energy dry solid fuel.

DESCRIPTION OF A PREFERRED EMBODIMENT

Figure 1:
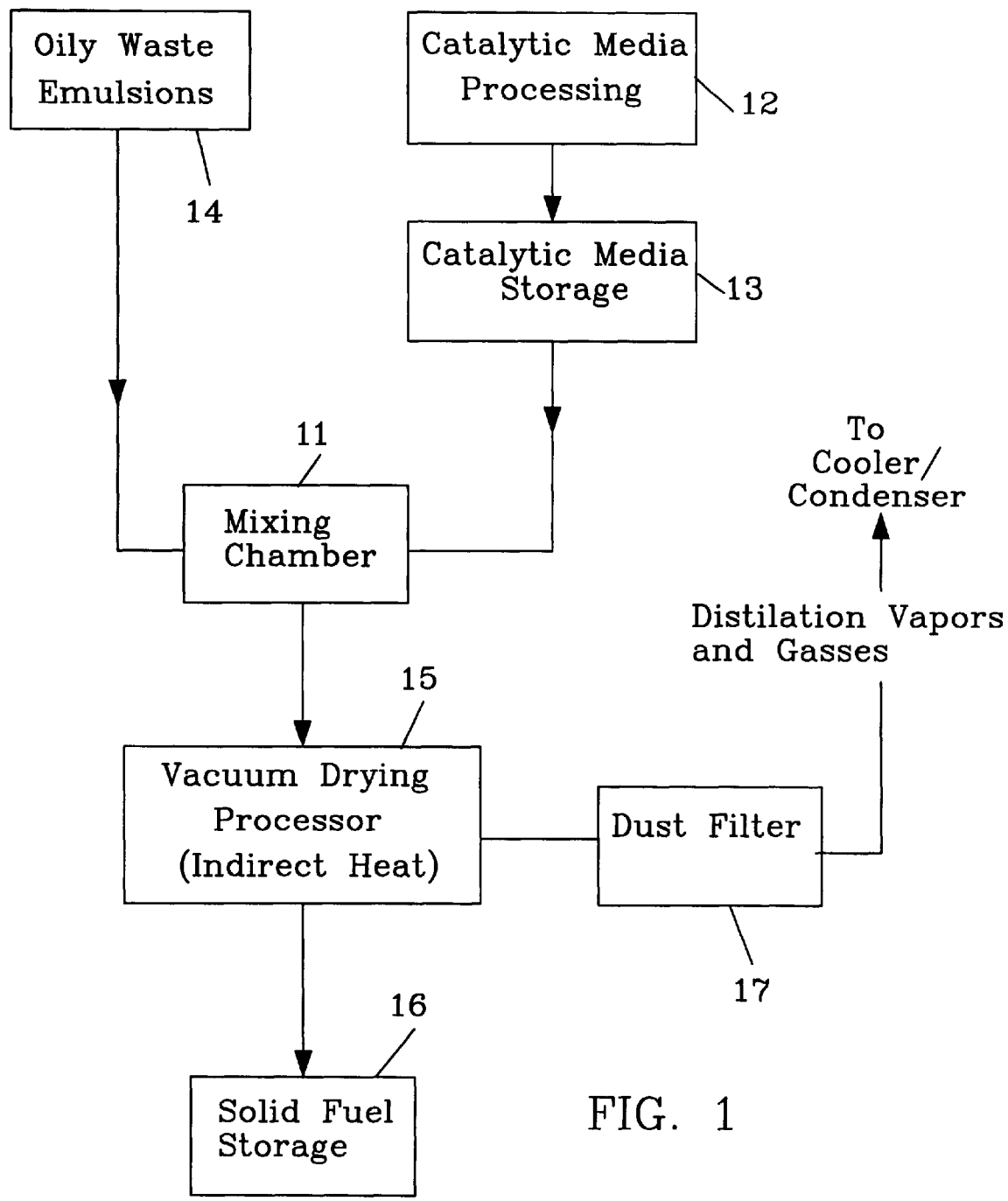
FIGS. 1 and 2 show a process flow diagram illustrating the invention.
Figure 2:
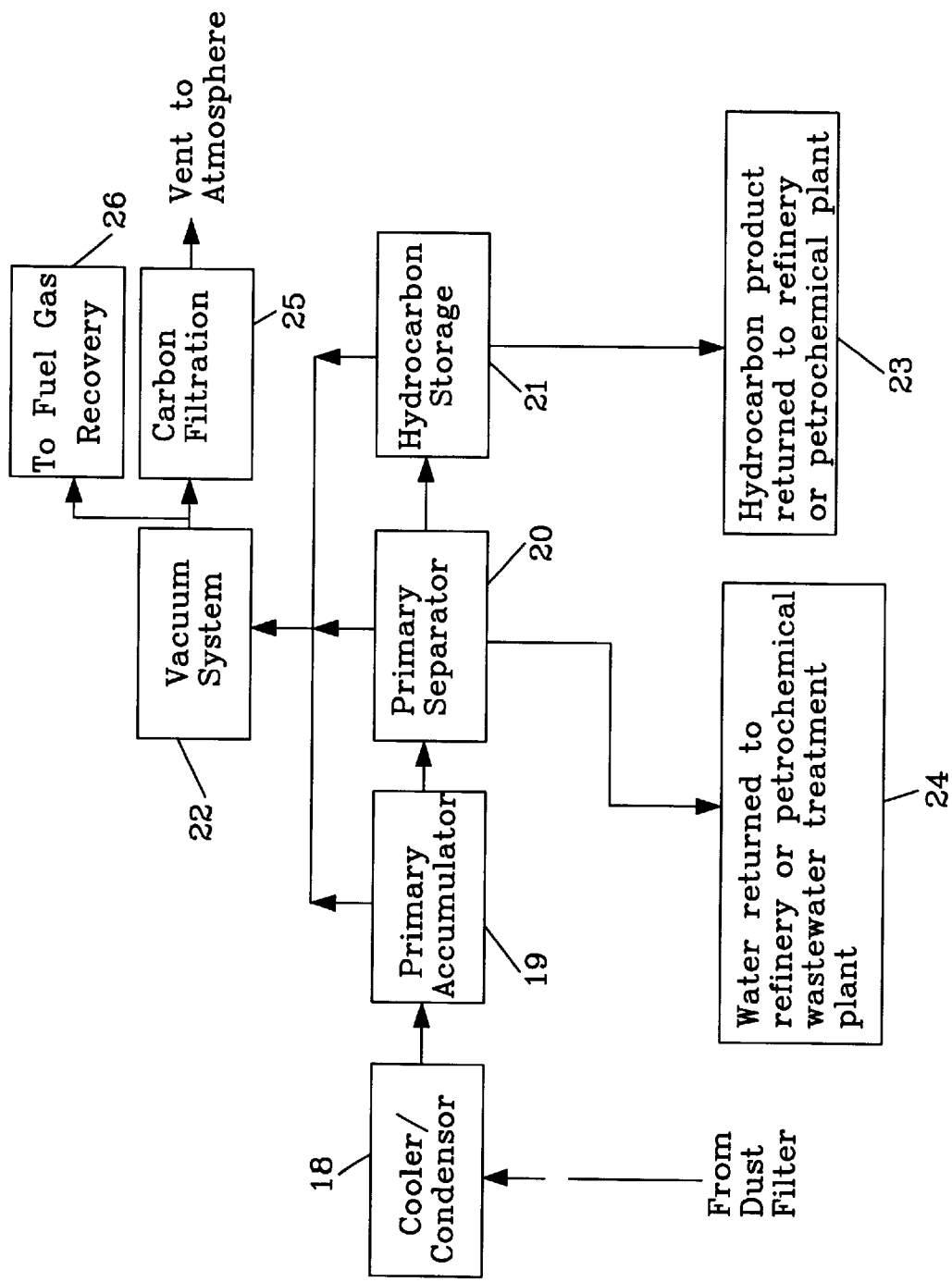

FIGS. 1 and 2 show a basic block diagram of the CVD process. A catalytic media 12 is provided and stored 13. The catalytic media can be any organic or mostly organic solid that can be reduced to a granular or fine powder consistency. Examples include but are not limited to kenaf, jute, coal, petroleum coke, tires, non-metallic automobile shredder residue (ASR), saw dust, tree bark, sewage sludge, various constituents of municipal solid waste (non-metallic garbage and sewer by-products) animal wastes, agricultural byproducts, and others. The catalytic media is ground or milled to a granular or fine powder consistency in order to provide maximum surface area interaction with the oily waste water. This provides increased surface area to the oily waste water which maximizes the heat exchange surface area of the mixture. The maximization of the heat exchange surface area greatly enhances the efficiency of the vacuum distillation process, described below, and provides for highly efficient removal and recovery of the water and hydrocarbons that are entrained in the waste mixture. Additionally, efficiency is achieved through the use of vacuum pressure verus atmospheric pressure in the indirect drying chamber 15. The vacuum pressure provides for a much lower distillation temperature thereby significantly reducing the dryer's heat energy requirements. The catalytic media then becomes the basic substrate of the dry solid fuel that exits the vacuum drying processor.

Oily waste emulsified mixtures of oil, water, and solids are stored 14 prior to being combined with the catalytic media in a mixing chamber 11. The oily waste may be generated on site, or may be transported from facilities producing the oily waste and stored prior to processing. The oily mixture is intimately mixed with the catalytic media until saturation occurs and there are no free liquids. The oily waste/catalytic media mixture is conveyed to a vacuum drying processor 15 that is indirectly heated and may have either single, double, or more rotating agitation shafts. As the oily waste/catalytic media mixture is heated under vacuum pressure, the water and hydrocarbons in the waste are distilled and removed from the vacuum drying processor via a vacuum system 22.

The boiling points of hydrocarbons is well know. For example, in THE CHEMISTRY AND TECHNOLOGY OF PETROLEUM, by James G. Speight, published 1991, it is shown in table 11 on page 280, and table 3 on page 522, the boiling points of various hydrocarbon elements. The range shown in the table is from about 18 to 649 degree F. It is also pointed out in FIG. 14 of this publication that there is a corresponding increase in boiling point with an increase in carbon number (molecular weight).

The dried solids that exit the vacuum drying processor 15 are conveyed through a totally enclosed system to storage 16 and are subsequently shipped to, for example, a cement plant or power plant to be used as a high energy solid fuel.

The vacuum system 22 transports the vapor and gaseous phase of the oily waste mixture through a dust filter 17 to remove dust and fine particulate material that may be drawn into the gas or vapor stream going to the cooler/condenser 18. The cooler/condenser 18 is where the water and hydrocarbons that are distilled and drawn from the waste/catalytic mixture are condensed.

The water and hydrocarbons are then separated in a primary accumulator 19 and primary separator 20 that are also under vacuum pressure from vacuum system 22. Condensed hydrocarbons are recovered and stored 21, and are later sent back to the refinery or petrochemical plant 23 for further processing into products.

Recovered water is collected in the primary separator 20 and pumped to the plant's wastewater treatment facility 24 where it is treated and either reused or discharged.

The exit gases from vacuum system 22 may be sent to an activated carbon filtration system 25 to remove any residual volatile organic compounds. Alternately, the exit gases may be returned to the refinery or petrochemical plant for fuel gas recovery 26.

What is claimed is:

1. A process for producing fuel from waste generated by petroleum refining and production, comprising the steps of:

mixing oily waste emulsion with a catalytic media selected from at least one of kenaf, jute, coal, petroleum coke, tires, saw dust, tree bark, sewage sludge, and agricultural by-products;

drying the mixture in a heated chamber to provide the fuel;

simultaneously with heating, applying a vacuum to draw off distillation vapors, gases and water vapors; and separating the water and gases, recycling the water and the gases.

2. The process according to claim 1, wherein the heat is applied indirectly to the heating chamber.

3. The process according to claim 1, wherein the catalytic media is at least partially organic material.

4. The process according to claim 1, wherein the gases and water vapors are through a dust filter to remove particulate matter.

5. The process according to claim 1, including the steps of passing the gases and water vapor through a condenser to separate the water and hydrocarbons from the gases.

6. The process according to claim 1, including the steps of passing the water and hydrocarbons through a primary accumulator and primary separator to separate the hydrocarbons from the water.

7. The process according to claim 1, including the step of grinding the catalytic media to a granular powder consistency.

8. A process for producing fuel from oily waste water emulsions generated by petroleum refining and production, comprising the steps of:

mixing oily waste water emulsion with a catalytic media selected from at least one of kenaf, jute, coal, petroleum coke, tires, saw dust, tree bark, sewage sludge, animal wastes, and agricultural byproducts;

drying the mixture in an indirectly heated chamber to provide the high energy fuel;

simultaneously with indirect heating, applying a vacuum to draw off distillation vapors, gases and water vapors;

filtering the distillation vapors, gases and water vapors to remove dust and particulate matter; and separating the oil, water and gases, and recycling the oil, water and gases.

9. The process according to claim 8, wherein the catalytic media is at least partially organic material.

10. The process according to claim 8, wherein the gases and water vapor is passed through a dust filter to remove particulate matter.

11. The process according to claim 8, including the steps of passing the gases and water through a condenser to separate the water and hydrocarbons from the gases.

12. The process according to claim 8, including the steps of passing the water and hydrocarbon through a primary accumulator and primary separator to separate the hydrocarbons from the water.

13. The process according to claim 6, including the step of grinding the catalytic media to a granular powder consistency.

\* \* \* \* \*